(12) United States Patent
Park (10) Patent No.: US 7,788,456 B1
(45) Date of Patent: Aug. 31, 2010

(54) USE OF DATA IMAGES TO ALLOW RELEASE OF UNNEEDED DATA STORAGE

(75) Inventor: Collin Y. Park, Redwood City, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1076 days.

(21) Appl. No.: 11/356,946

(22) Filed: Feb. 16, 2006

(51) Int. Cl.
*G06F 12/16* (2006.01)

(52) U.S. Cl. .................................. 711/161; 711/162

(58) Field of Classification Search ............ None
See application file for complete search history.

(56) References Cited

U.S. PATENT DOCUMENTS

| | | | |
|---|---|---|---|
| 5,819,292 | A | 10/1998 | Hitz et al. |
| 6,085,298 | A | 7/2000 | Ohran |
| 6,636,879 | B1 | 10/2003 | Doucette et al. |
| 6,771,843 | B1 | 8/2004 | Huber et al. |
| 6,820,099 | B1 | 11/2004 | Huber et al. |
| 6,857,001 | B2 | 2/2005 | Hitz et al. |
| 6,883,074 | B2 | 4/2005 | Lee et al. |
| 6,928,526 | B1 | 8/2005 | Zhu et al. |
| 6,957,362 | B2 | 10/2005 | Armangau et al. |
| 6,959,310 | B2 | 10/2005 | Eshel et al. |
| 7,065,619 | B1 | 6/2006 | Zhu et al. |
| 7,072,910 | B2 | 7/2006 | Kahn et al. |
| 7,127,480 | B2 * | 10/2006 | Kline et al. ................. 707/204 |
| 7,127,577 | B2 | 10/2006 | Koning et al. |
| 7,337,288 | B2 | 2/2008 | Kiselev et al. |
| 7,363,444 | B2 * | 4/2008 | Ji ............................... 711/161 |
| 7,472,242 | B1 | 12/2008 | Deshmukh et al. |
| 7,509,468 | B1 * | 3/2009 | Dalal et al. ................. 711/163 |
| 2002/0083037 | A1 | 6/2002 | Lewis et al. |
| 2003/0158862 | A1 * | 8/2003 | Eshel et al. ................. 707/200 |
| 2004/0153736 | A1 | 8/2004 | Viswanathan et al. |
| 2005/0033775 | A1 | 2/2005 | Chen et al. |
| 2005/0182799 | A1 | 8/2005 | Hitz et al. |
| 2007/0027937 | A1 | 2/2007 | McGrattan et al. |

OTHER PUBLICATIONS

Watson, Andy et al., "Multiprotocol Data Access: NFS, CIFS, and HTTP," Network Appliance, Inc., Sunnyvale, CA, USA, TR 3014, 2005, 51 pages.
Hitz, Dave et al. "File System Design for an NFS File Server Appliance," Network Appliance, Inc., Sunnyvale, CA, USA, TR 3002, 2005, 13 pages.
"Network Appliance Snapshot Technology," Network Appliance, Inc., Sunnyvale, CA, USA, 2004, 1 page.

(Continued)

*Primary Examiner*—Than Nguyen
(74) *Attorney, Agent, or Firm*—Blakely, Sokoloff, Taylor & Zafman LLP (57) ABSTRACT

Use of data images to allow release of unneeded data storage. An embodiment of a method includes generating a series of archives of a set of data, each archive of the series of archives being stored in a data storage. The method further includes releasing an older archive in the series of archives from the data storage after a new archive in the series of archives is generated. A point-in-time image of the data storage is generated after each new archive in the series of archives is generated, with the data captured by the image including data contained in the new archive.

25 Claims, 8 Drawing Sheets

OTHER PUBLICATIONS

"Network Appliance SnapVault Software," Network Appliance, Inc., Sunnyvale, CA, USA, 2003, 2 pages.

"Network Appliance SnapRestore Software," Network Appliance, Inc., Sunnyvale, CA, USA, 2002, 2 pages.

"Network Appliance—Products—Snapshot Technology," Network Appliance, Inc., Sunnyvale, CA, USA, 2005, downloaded from http://www.netapp.com/products/snapshot.html?fmt=print, 2 pages.

"Network Appliance SnapMirror Software," Network Appliance, Inc., Sunnyvale, CA, USA, 2003, 2 pages.

"Unique Benefits and Competitive Advantages of NetApp Snapshot Technology," Network Appliance, Inc., Sunnyvale, CA, USA, 2004, 4 pages.

"VERITAS NetBackup 6.0 Disk-Based Data Protection," VERITAS Software Corporation, Mountain View, CA, USA, 2005, 2 pages.

"VERITAS NetBackup 6.0 Server," VERITAS Software Corporation, Mountain View, CA, USA, 2005, 4 pages.

"Optimizing Data Protection with VERITAS and Network Appliance," VERITAS Software Corporation, Mountain View, CA, USA, and Network Appliance, Inc., Sunnyvale, CA, USA, 2005, 2 pages.

"VERITAS NetBackup 6.0 Technical Overview Unabridged Version," VERITAS Software Corporation, Mountain View, CA, USA, Jun. 2005, 70 pages.

* cited by examiner

Snap0
305

Snap1
310

Snap2
315

Snap3
320

Snap4
325

Snap5
330

Snap6
335

Fig. 3

Snap0
405

A0

Snap1
410

A1

Snap2
415

A2

Snap3
420

A3

Snap4
425

A4

Snap5
430

A5

Snap6
435

USE OF DATA IMAGES TO ALLOW RELEASE OF UNNEEDED DATA STORAGE

FIELD OF THE INVENTION

At least one embodiment of the present invention pertains to data storage, and more particularly, to a method and apparatus for the use of data images to allow release of unneeded data storage.

BACKGROUND

A storage server is a special-purpose processing system used to store and retrieve data on behalf of one or more client processing systems ("clients"). A file server is an example of a storage server. A file server operates on behalf of one or more clients to store and manage shared files in a set of mass storage devices, such as magnetic or optical storage based disks or tapes. The mass storage devices may be organized into one or more groups of Redundant Array of Inexpensive Disks (RAID). In a storage area network (SAN), a storage server can provide clients with block-level access to stored data, rather than file-level access. Some storage servers are capable of providing clients with both file-level access and block-level access, such as certain Filers produced by Network Appliance, Inc. of Sunnyvale, Calif.

Among the uses of a storage server, including a file server, is the essential process of saving backup copies or archives of files to enable retrieval of files after such files have been modified, deleted, or otherwise lost. In certain operations, it is common to make a regular series of backups of data files, and to possibly make interim backups of changed files in between full backups. The more often that data is backed up, the more likely it is that lost files in a particular desired form can be recovered.

However, backup copies inevitably require storage space, and frequent backups can create significant storage space requirements. Even if archives are eliminated after they reach a certain threshold age, it is common for a system to include images of older data that is no longer required. The storage of this unneeded data wastes space that is contained in or that is managed by the storage server, and the amount of unavailable space can increase as more frequent backups are performed.

SUMMARY OF THE INVENTION

An embodiment of the invention provides for use of data images to allow release of unneeded data storage.

One aspect of the invention is a method that includes generating a series of archives of a set of data, with each archive of the series of archives being stored in a data storage. An older archive in the series of archives is released from the data storage after a new archive in the series of archives is generated. A point-in-time image of the data storage is generated after each new archive in the series of archives is generated, with the data captured by the image including data contained in the new archive.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus are disclosed for the use of data images for release of unneeded data storage. In an embodiment of the invention, a process and system use snapshots that are taken of data to prevent the storage of data blocks that are not needed. In an embodiment, an archive of certain data is deleted after a newer archive is generated, with the data in the archive being retained as long as required through the storage that is provided by a snapshot of the data.

The following are certain terms used in the description:

As used herein, a "snapshot" is a point-in-time image of data. A snapshot includes a read-only, persistent, point-in-time image (PPI) of a data set, such as a volume or a logical unit number (LUN). The terms snapshot, image, and related terms may be used to describe certain images of data. A snapshot includes, but is not limited to, a NetApp SnapShot™ of Network Appliance, Inc. The term "snapshot" is used in this document without derogation of Network Appliance, Inc.'s trademark rights. A snapshot is intended to capture persistently the exact state of data in a data set at a point in time when the snapshot was taken. This allows the state of the data set to be restored from the snapshot in the event of, for example, corruption of data. The ability to restore data from a snapshot provides administrators with a simple mechanism to revert the state of their data to a known previous state in time as captured by the snapshot. Creation of a snapshot or restoration from a snapshot can be controlled from a client-side software tool, such as SnapDrive™ or SnapManager® for Microsoft® Exchange, both made by Network Appliance, Inc, and Veritas NetBacicup™ (versions 6.0 and later) of Veritas Software and Symantec Corporation. In contrast to other PPI implementations, NetApp Snapshots do not require duplicated data blocks in an active file system because the active file system can include pointers to data blocks in a snapshot for any blocks that have not been modified since the snapshot was taken.

As used here, "volume" means a logical data set that is an abstraction of physical storage, combining one or more physical mass storage devices (e.g., disks) or parts thereof into a single logical storage object, and which is managed as a single administrative unit, such as a single file system. A volume may be defined from a larger group of available storage, such as an aggregate. The physical storage of a volume may vary in different implementations. For example, a volume referred to herein as a "flexible volume" is a volume that is flexibly associated with the underlying physical storage, while a "traditional volume" is a volume that is mapped directly to the underlying physical storage.

As used herein, an "aggregate" is a logical aggregation of physical data storage. An aggregate may be a logical container for a pool of storage, combining one or more physical mass storage devices (e.g., disks) or parts thereof into a single logical storage object, which contains or provides storage for one or more other logical data sets at a higher level of abstraction (e.g., volumes). An aggregate may hold different kinds of volumes, such as a "traditional volume" that is mapped directly onto the physical storage in an aggregrate, or zero or more "flexible volumes" that are flexibly mapped to the storage provided by the aggregate.

As used here, a "logical unit number (LUN)" is a logical data container, which is thus a type of logical storage object. A LUN may be a virtual partition of a RAID group. In one example, a LUN may be formed as a "stripe" that is one or more blocks wide, across the disks in a RAID group, where a block may be, for example, a 4 KByte chunk of storage space. A LUN may appear to a client, for practical purposes, as a physical storage device such as a disk.

As used here, an "archive" is a copy of data that is stored, and "to archive" describes the act of storing a copy of data. Archives may be stored in various different locations, with archived data generally being stored separately from the original data to safeguard the data in case of data loss in the primary data storage, to maintain less often used data in another location for efficiency, or for other similar purposes. For example, a copy of a set of data in a first data storage (which may be referred to as a primary data storage) may be archived in a second data storage (which may be referred to as a secondary data storage). An archive may or may not be stored in a different form as the original data, such as, for example, a compressed form to reduce storage space. A series of archives of data may be made for a system, with the archives possibly being made periodically or according to a certain schedule. For the purposes of this application, an archive and a back-up may be used interchangeably. An archive may also refer to the storage repository for data that is to be saved or preserved.

In one embodiment of the invention, a storage server, such as a file server, acts to eliminate unneeded data in a backup process. As used herein, data is "unneeded" or "not required" when a system administrator, a user or client system, or other such party has determined that such data can be released. In a particular example, data is unneeded in a backup process if the data falls outside of the group of data that is intended to be retained, such as when data that is older than a certain threshold age is not intended to be retained. In an embodiment, a storage server system utilizes snapshots or other data images to limit data retention to needed data (the data that is intended to be retained) and to allow release of data that is older than a certain age and thus is no longer needed. As used here, release of an archive or data means elimination of the storage for the archive, which may allow the storage space to be used for other purposes. The release of an archive may sometimes be referred to as the deletion of the archive, although the actual deletion of each item of data in the archive may not be required. In an embodiment of the invention, a storage server eliminates an older data archive after a new archive is generated, and before a snapshot of the data storage is generated, thereby preventing the snapshots from maintaining older archived data and freeing storage space for the storage server.

An administrator of a computer system may desire to make backup copies of data to enable the recovery of data in case of accidental or deliberate erasure of the primary copies of the data. In determining backup policies and procedures, there may be reasons to retain copies of multiple different versions of the data. For example, it may be useful to recover a version of a particular file as it existed before an event affected the file, such as before a virus invaded the file. In order to enable the storage server to easily recover data at particular points in time, multiple snapshots may also be taken of data.

An embodiment of the invention may be implemented in a storage system that includes a primary storage and a secondary storage, with the secondary storage being used to archive or backup the data stored in the primary storage. The data structures or format used by the storage server may vary with the particular embodiment. Embodiments of the invention include, but are not limited to, data servers in which data is contained within data volumes, with the volumes being contained in certain data aggregates. The volumes may include various types of storage, such as traditional and flexible volumes. In an embodiment, the storage server periodically backs up certain data from the primary server to be archived in the secondary storage. The data archives may include both full and partial backups of the relevant data, as needed or required. In addition, snapshots or other images may be taken of the data stored in the secondary storage. In addition, it may be advantageous to take snapshots of memory to ensure that the structure of the system at certain times is maintained. A snapshot can provide easy access to older versions of files, directory hierarchies, and logical unit numbers.

For example, one or more snapshots could be taken after each backup of the data is made. If more than one backup has been made (such as if each backup is retained for a certain period of time), then the snapshot may reflect the contents of multiple data archives that existed at a point in time. Thus, the data archival process may result in certain data storage that is unavailable. Each snapshot results in retaining the blocks of data in the archive that are reflected in the snapshot. When a number of snapshots have been generated, then the earlier snapshots may reflect earlier backups even if all or some portion of the data contained in the archives includes data that is no longer needed. Disk space may be locked up in snapshots even if archive files are deleted from the current file system of the secondary storage server. Under an embodiment of the invention, the excessive disk space consumption can be alleviated by eliminating older archives when new archives are generated, and by generating snapshots of the new archives as they are generated. By eliminating the older archives, space may be freed that would otherwise be unavailable. The needed data from the archives is retained through use of the snapshots of the secondary storage.

Embodiments of the invention may include data structures in which data may be shared between storage elements. For example, a storage server may provide for a data block is shared by a first archive and a second archive if the data block is not changed between the time the first archive was created and the time the second archive is created. In such a manner, the additional storage required in a secondary storage when an additional archive is generated is generally limited to data blocks that have been added or modified. However, even though data blocks may be shared between archives, the data storage is still not optimal. If periodic snapshots of the secondary storage capture the form of the data as it existed at a particular moments in time, then the snapshots include the archives existing when the snapshots were generated. If an archive is later deleted, such as because the archive has reached a certain threshold age, then the data of the archive that is not shared with other archives cannot be released if such data is recorded by snapshots that still exist. For this reason, in certain systems the release of the blocks of data of an archive is not possible until the snapshot of the archive is released. In an embodiment of the invention, older archives are released as new archives are generated, thereby preventing the generation of snapshots with the older data, thus the older, unneeded data may be released as required.

While an embodiment of the invention is particularly useful in a system in which data blocks are shared by archives and snapshots of data, embodiments of the invention are not limited to shared data structures and are applicable to any storage in which data archives are stored and secondary images (such as snapshots) of the data archived are generated. In one possible embodiment, memory technology may include NetApp Snapshot technology of Network Appliance, Inc. The memory technology may be included in the WAFL™ (Write Anywhere File Layout) file system of Network Appliance, Inc. WAFL is Network Appliance's proprietary file system, and is a part of the Data ONTAP® operating system, Network Appliance's proprietary storage operating system. However, embodiments of the invention are not limited to any particular storage technology.

Figure 1:
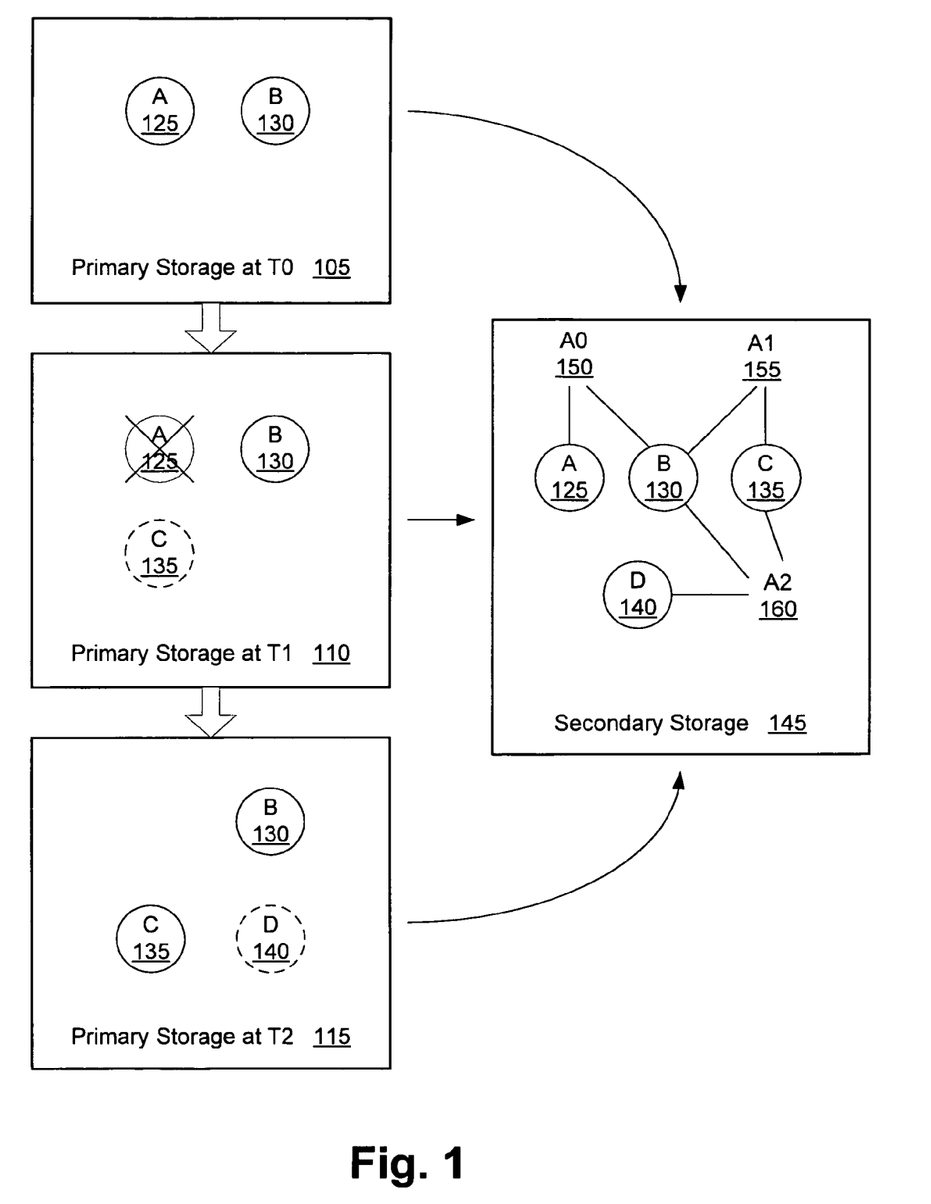
FIG. 1 illustrates the generation of archives of data under an embodiment of the invention.

FIG. 1 illustrates the generation of archives of data under an embodiment of the invention. In this illustration, a primary storage is initially shown at a particular time T0 105. At time T0, the primary storage includes, for example, two data blocks, block A 125 and block B 130. A secondary storage 145 may be used to back up the data from the primary storage. A first archive A0 150 will include copies of block A 125 and block B 130.

As time passes, additional archives in a series of archives are made. For example, at time T1 110 the primary storage may include block B 130, but block A 125 no longer is present. As shown in FIG. 1, archive A1 155 may share the data block B 130 if the storage system includes this memory construct. Further, a new data block C 135 may now exist. Following this, a new archive is created, shown as archive A1 including blocks B 130 and C 135. Finally the primary storage is shown at time T2 115, at which time data block 140 has been added. The next archive, archive A2 160, thus includes block B 130, block C 135, and block D140. While the data elements have been simplified for the sake of illustration, any type of addition, deletion, or modification of data may occur during the time between the generation of successive data archives.

Under an embodiment of the invention, snapshots or point-in-time images are taken of data contained in the secondary storage 145, the snapshots being used to minimize the storage of unneeded data that should be removed. Under an embodiment, older archives are deleted as new archives are generated, and thus snapshots taken only include the new archives, which allows the release of older data as needed.

Figure 2:
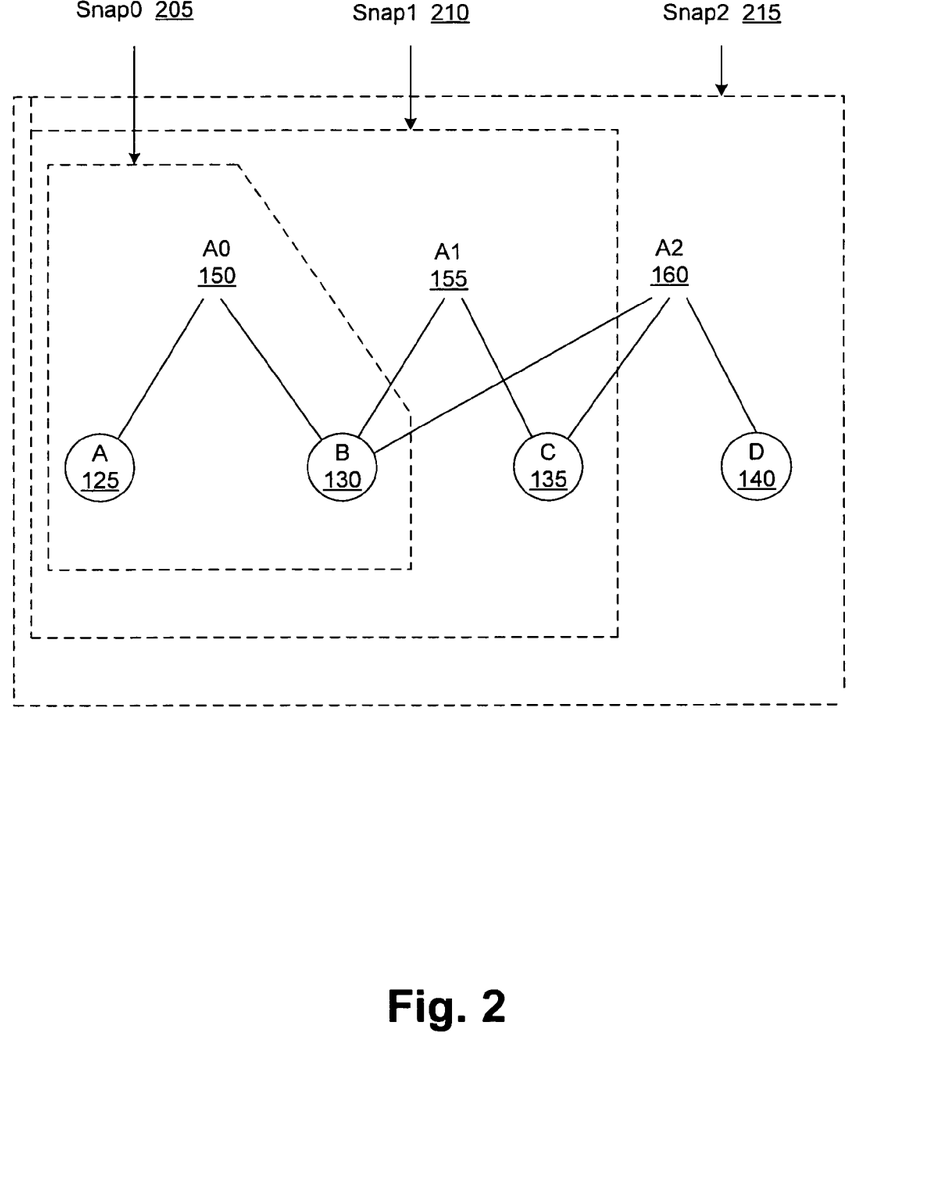
FIG. 2 is an illustration of an embodiment of the generation of images of data storage.

FIG. 2 is an illustration of an embodiment of the generation of images of data storage. Utilizing the archives illustrated in FIG. 1 as an example, a snapshot can be formed after each archive in the series of archives is created. Thus a first snapshot Snap0 would capture archive A0 150, which includes data block A 125 and data block B 130. If archive A0 is maintained, then a second snapshot Snap1 210 would capture archive A0 150 and archive A1 155, thus including block A 125, block B 130, and block C 135. Following, if A0 and A1 are maintained, then a third snapshot Snap2 215 would capture archive A0 150, archive A1 155, and archive A2 160, thus including block A 125, block B 130, block C 135, and block D 140. While for illustrative purpose only the archives A0, A1, and A2 are shown, snapshots may include other data in a data storage and are not limited to recording images of such archives.

In an embodiment of the invention, an older archive is removed when a new archive is stored. A snapshot taken after this point thus will not include data blocks of the older archive that are not shared by the new archive. In an embodiment of the invention, the data blocks of each archive will be retained because of the snapshot taken of the archive. However, when older data should be removed, for example when the data has reached a certain threshold age (such as a certain number of days, weeks, or other time period) and is no longer required, data from old archives will not be present in the snapshots because the old archives are removed before the snapshots are generated.

Figure 3:
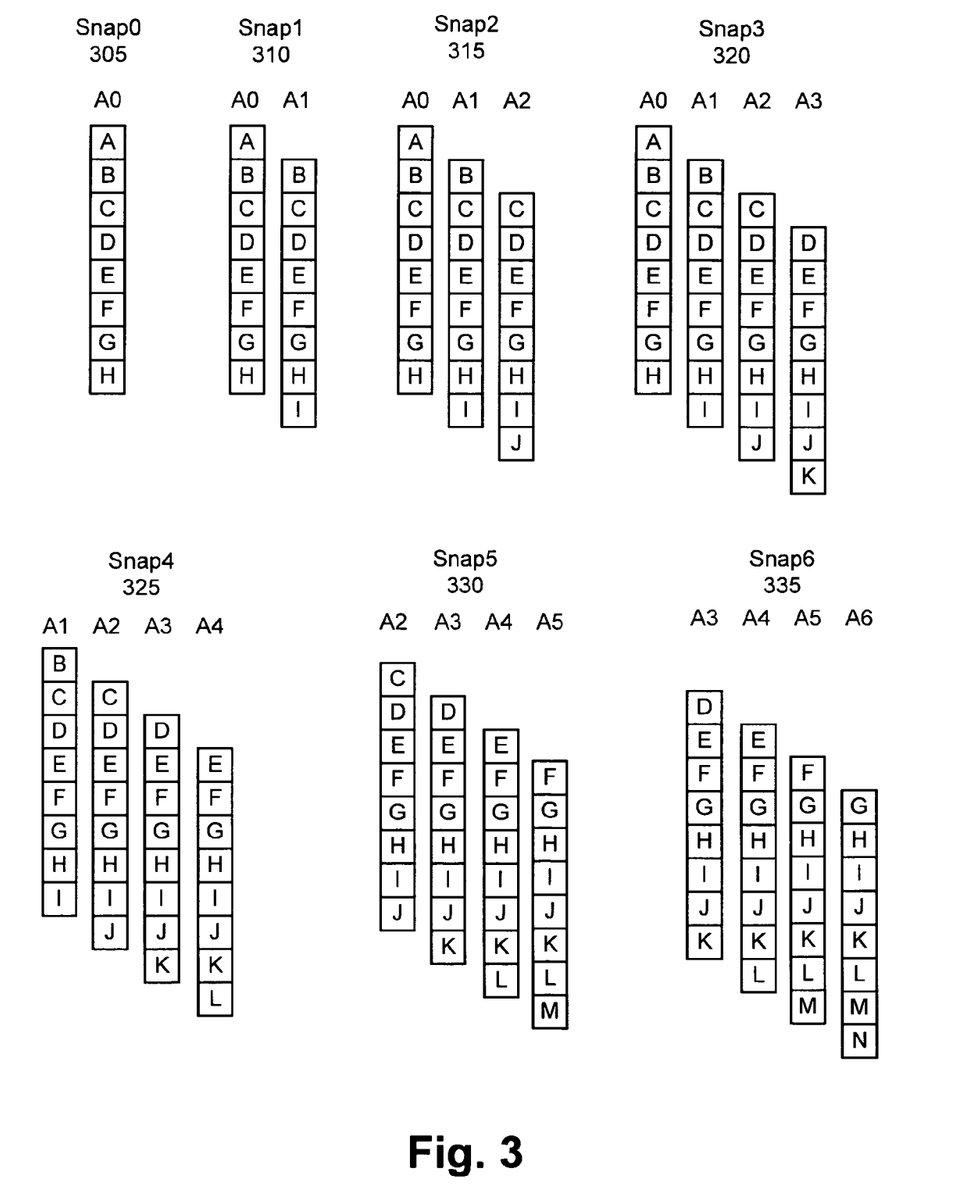
FIG. 3 is an illustration of data archival that may include an embodiment of the invention.

FIG. 3 is an illustration of data archival that may include an embodiment of the invention. In a particular example, backups are retained for four time periods (such as four weeks), but any embodiments of the invention may include any applicable data retention policy. In this illustration, a series of archives may be generated. A first archive A0 of a data set is taken at a certain time, with a first snapshot Snap0 305 being generated after archive A0 has been generated. In this example, blocks A through J represent a certain number of data blocks that were contained in the data set and are then archive in archive A0. In this example, the archives may be weekly full backups of the data. This process is continued in a second week in which a second archive A1 is generated and a second snapshot Snap1 310 is generated, which now includes both A0 and A1. In this example, at the time backup A1 is made the data has changed such that block A is no longer available, and a new data block K is now included. While the illustration indicates that A0 includes blocks A through H and A1 includes blocks B through I, blocks B through H may be shared between A0 and A1 in certain environments.

The backup process continues with archive A2 and snapshot Snap2 315, and archive A3 and snapshot Snap3 320. However, with the next backup the first archive A0 is deleted because it is now four time periods old, and thus Snap4 325 includes archives A1 through A4—archive A0 is no longer needed or required for the backup of the data. In addition, snapshot Snap0 is also deleted because it is four time periods old. This process continues with Snap5 330 and Snap6 335, in which archives A2 and A3 are respectfully deleted. However, after Snap6 is generated, the resulting storage contains certain unneeded data. As can be seen, snapshot Snap3 contains data blocks A, B, and C even though these data blocks were deleted or modified more than four time periods earlier. As a result, blocks A through C are using space that could be used for other items. While for illustrative purpose only the archives are shown, the snapshots may include other data in a file storage and are not limited to recording images of such archives.

In an embodiment of the invention, the process of obtaining and retaining archives and snapshots is modified. In an embodiment, the fact that snapshots are being used is applied to allow the deletion of old archives before each snapshot is taken. For example, it can be seen from FIG. 3 that retaining only the most recent archive results in retaining all of the data needed, which in this particular example would be data blocks D through N.

Figure 4:
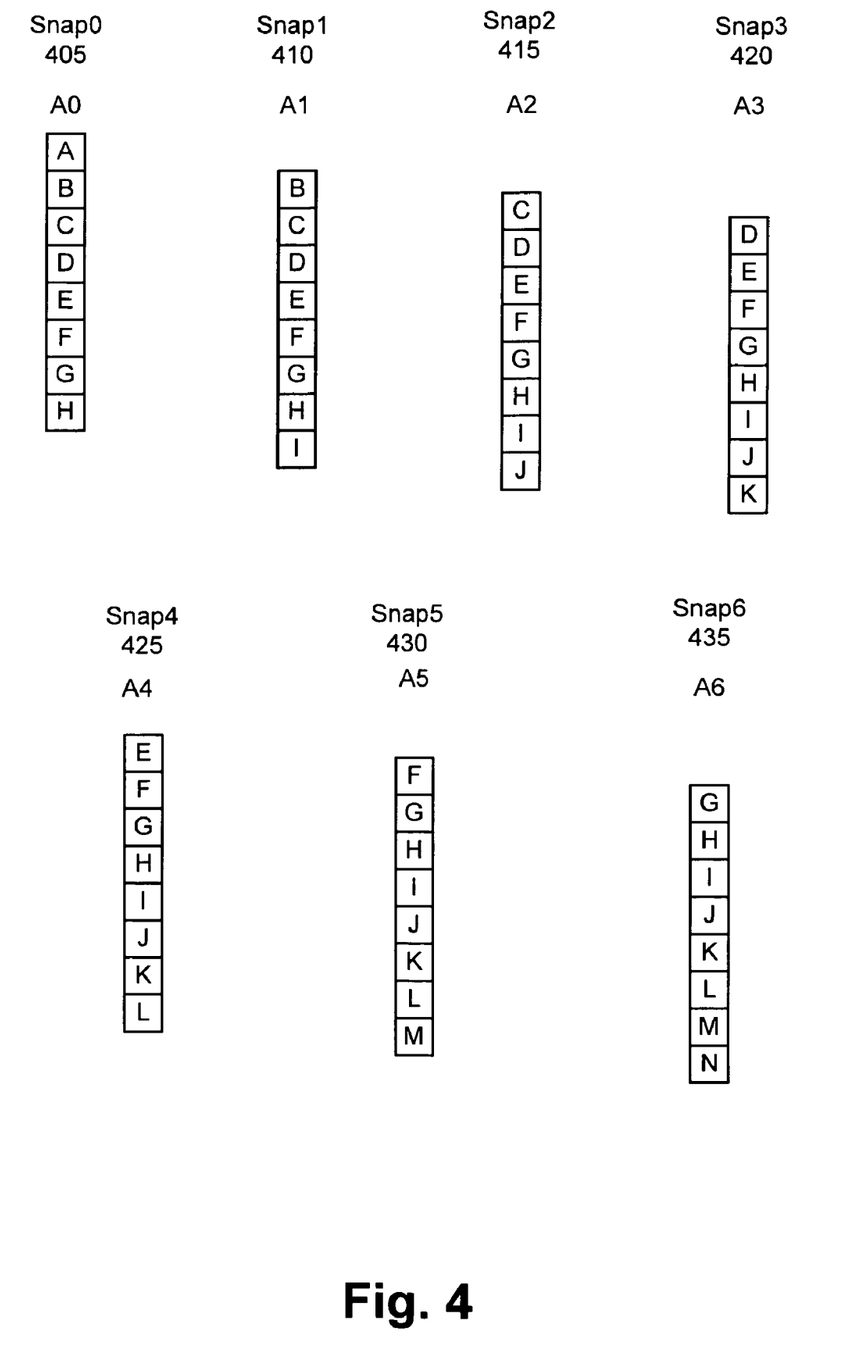
FIG. 4 is an illustration of data archival under an embodiment of the invention.

FIG. 4 is an illustration of data archival under an embodiment of the invention. In this illustration, an existing archive is deleted after the next archive is generated and before a snapshot is taken. In this way, the older data blocks are eliminated, while all of the needed data is retained through the snapshots of the data.

For example, FIG. 4 again illustrates a system in which data is archived once each time period in a series of archives and at least one snapshot is generated after each archive is stored. However, each archive will be deleted at the end of a certain time period after the new archive is generated. In this illustration, a first archive A0 is generated, including data blocks A through H, and captured by a first snapshot Snap0

405. When the next archive A1 is generated, A0 is released. As a result, the next snapshot Snap1 410 only includes the elements of A1, while Snap0 continues to include A0, including data element A that is not present in archive A1.

The illustrated archival process may continue, with archive A2 (data blocks C through J) being captured by snapshot Snap2 415, archive A3 (data blocks D through K) being captured by snapshot Snap3 420, archive A4 (data blocks E through L) being captured by snapshot Snap4 425, archive A5 (data blocks F through M) being captured by snapshot Snap4 430, and archive A6 (data blocks G through N) being captured by snapshot Snap6 435. In each case, the previous archive is eliminated after the new one is formed, and thus the new snapshot only includes the elements of the latest archive. However, the elements present in older archives are maintained by the snapshots that are generated after the generation of each archive. Thus, in this particular example, if data older than four time periods are released, the last four snapshots will retain data elements D through N, which is the data that is required for the archives A3 though A6. However, no additional data that is not required is retained, with the space for the older unneeded data being released when the older snapshots are eliminated.

For illustration, FIG. 4 provides archives that may represent full backups of the data. However, embodiments of the invention are not limited to this. For example, incremental or differential archives may also be made, such as one or more incremental archives being generated between two successive full archives. (In general, a differential archive stores all files that have been stored since the last full backup, and an incremental archive stores all files that have changed since the preceding full, incremental or differential archive.) A snapshot may be generated subsequent to the generation of the incremental archive. The deletion of previous archives may vary in different implementations. For example, in one embodiment of the invention, a previous archive is deleted after an incremental archive is generated. In another embodiment, the archive may be retained until after the next full archive is generated.

Figure 5:
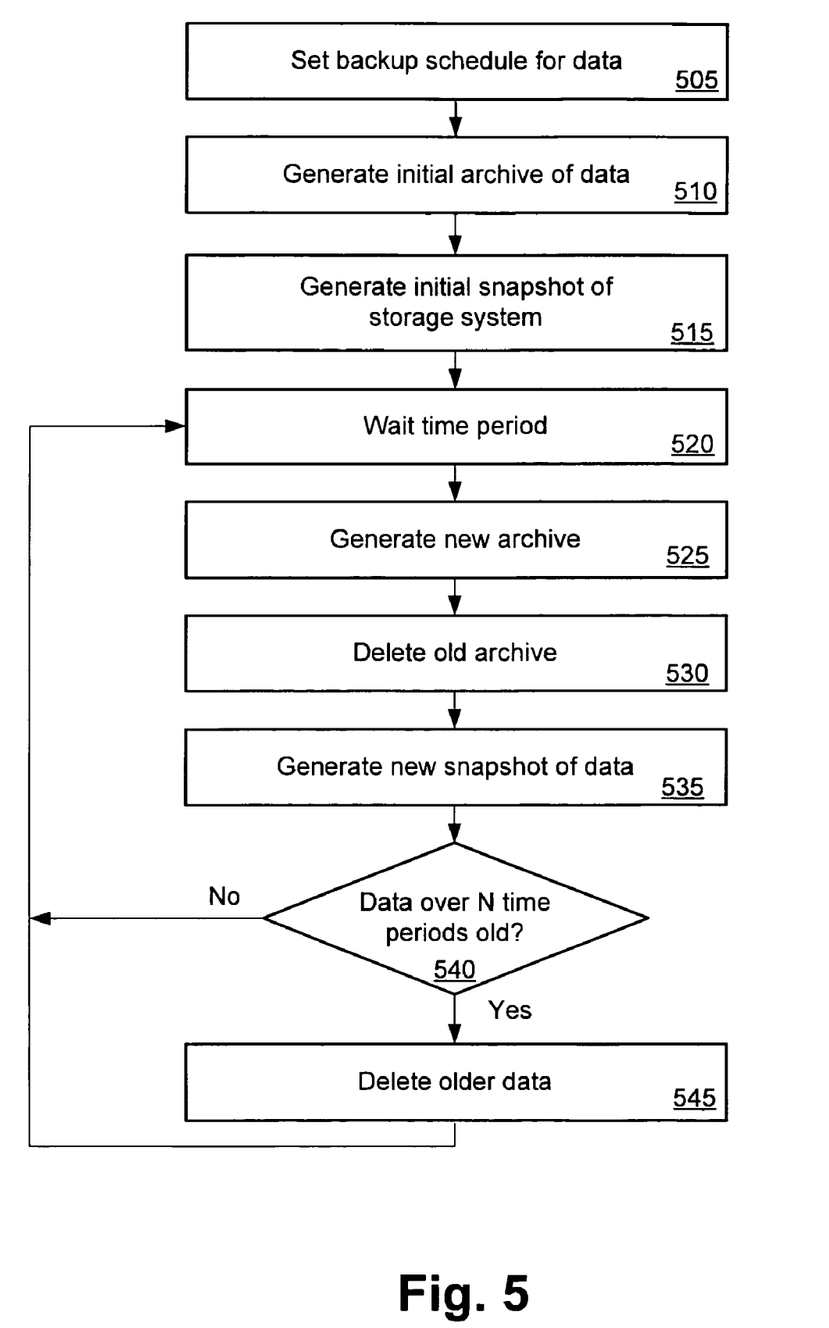
FIG. 5 is a flowchart to illustrate an embodiment of data archival.

FIG. 5 is a flowchart to illustrate an embodiment of data archival. For example, the process illustrated may provide for backing up data in a first (or primary) data storage or file storage by producing and storing archives in a second (or secondary) data storage or file storage. In this illustration, a system may initially set up a schedule for the backup or archival of data 505. For example, the schedule may provide that an archive of a set of data is generated every time a certain unit of time has elapsed. The schedule may further provide for snapshots or other point-in-time images of the data to be taken. The schedule for the data archives and the data snapshots may not match, and the number of archives and snapshots may not be equal. For example, multiple snapshots may be taken between each archive of the data.

As illustrated, an initial archive of the data is generated 510 and an initial snapshot of the storage system is generated, which will include the initial archive of data 515. After a particular period of time elapsed 520, it will be time to generate a new archive to back up the data. A new archive is created 525, which captures the current state of the data. In an embodiment of the invention, the existing archive is deleted 530, which does not lead to the release of needed data because the previous snapshot or snapshots of the system include the data blocks of the deleted archive. A new snapshot is then created 535, thereby again generating a current image of the data storage. In certain embodiments multiple snapshots of data may be created between the deletion of an archive of data and the generation of the next succeeding archive.

There is then a determination whether the data in the secondary storage is over N time periods old 540. For example, if backup archives are generated every week and are only needed for ten weeks, there is a determination whether any data is over ten weeks old. If any archives or snapshots are greater than N timer periods old, then the older data is deleted 545. Under an embodiment of the invention, the deletion of the older data results in eliminating data in snapshots that would be beyond N time periods old because each existing data archive is deleted before the following snapshot is taken. In this manner, the storage server maintains the data that is required, but opens up storage that would otherwise not be available.

Figure 6:
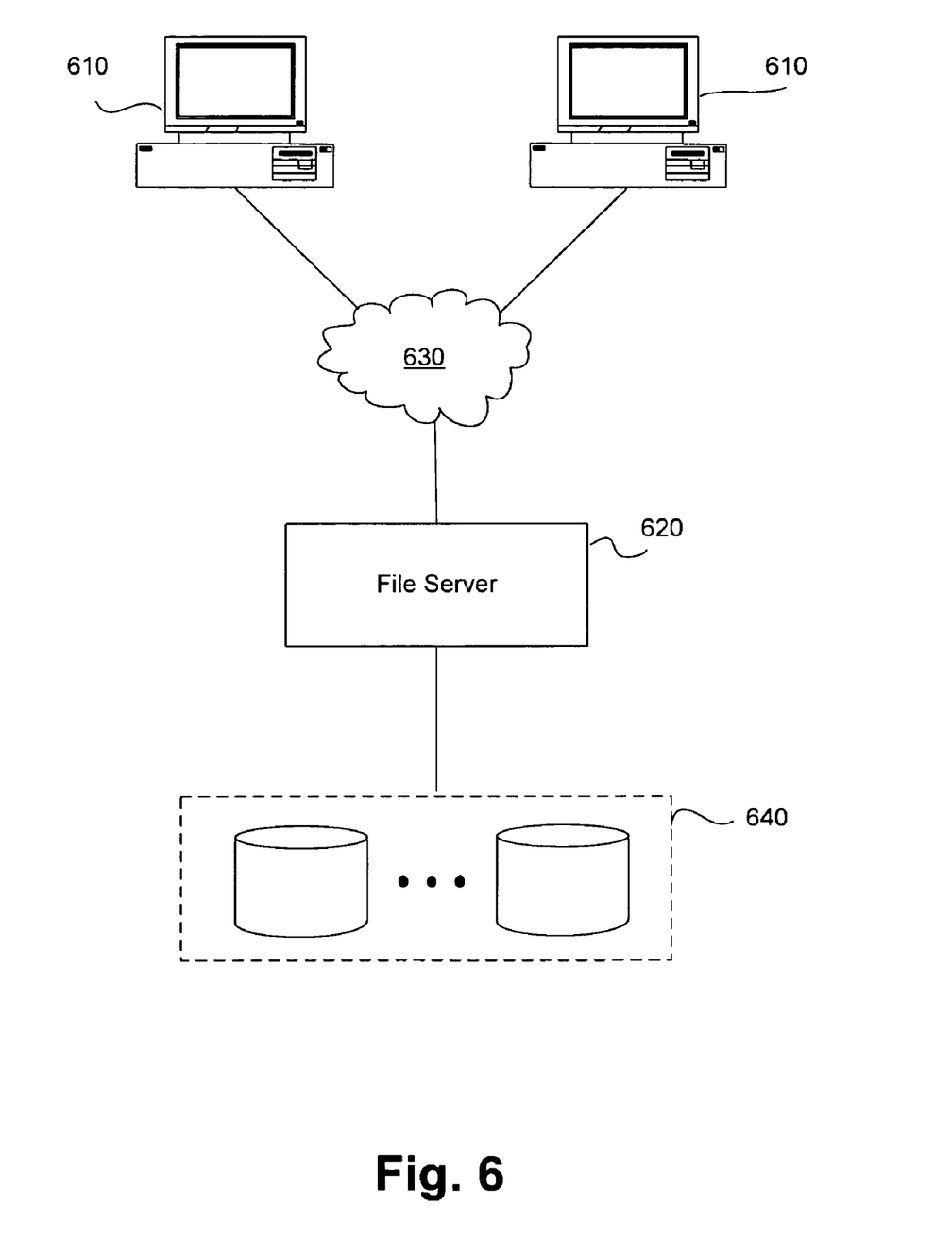
FIG. 6 is an illustration of a network environment in which an embodiment of the invention may be implemented.

FIG. 6 is an illustration of a network environment in which an embodiment of the invention may be implemented. However, embodiments of the invention are not limited to any particular environment, and may be implemented in various storage processes. In this illustration, the storage system includes a storage server, such as a file server 620. The file server 620 is coupled with a storage subsystem 640, which includes a set of mass storage devices 650, and to a set of clients 610 through a network 630, such as a local area network (LAN) or other type of network. Each of the clients 610 may be, for example, a conventional personal computer (PC), workstation, or the like. Storage subsystem 640 is managed by the file server 620. For example, the file server 620 may receive and respond to various read and write requests from the clients 610, directed to data stored in or to be stored in storage subsystem 640. The mass storage devices 650 in storage subsystem 640 may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data.

The file server 620 may have a distributed architecture; for example, it may include separate N-blade (network blade) and D-blade (data blade) components (not shown). In such an embodiment, the N-blade is used to communicate with clients 610, while the D-blade includes the file system functionality and is used to communicate with the storage subsystem 640. Alternatively, the file server 620 may have an integrated architecture, where the network and data components are all contained in a single box or unit. The file server 620 further may be coupled through a switching fabric to other similar storage systems (not shown) that have their own local storage subsystems. In this way, all of the storage subsystems can form a single storage pool, to which any client of any of the storage systems has access.

Figure 7:
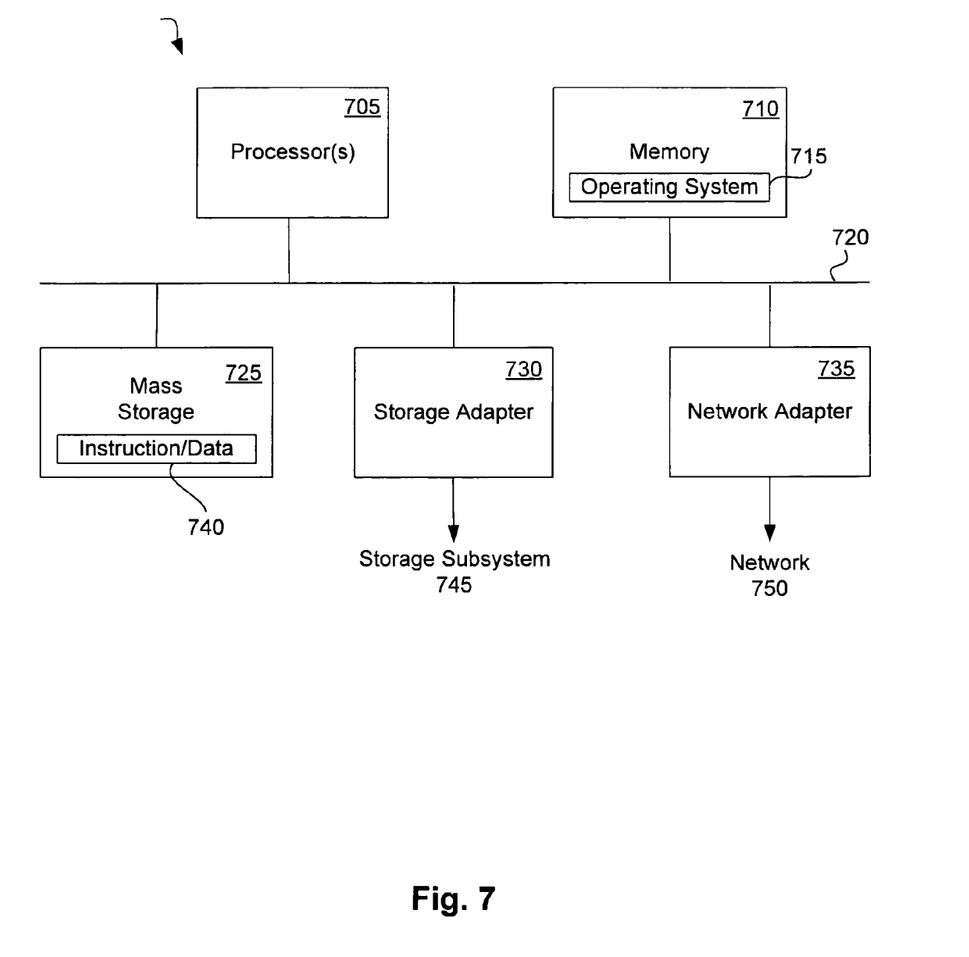
FIG. 7 is a block diagram illustrating an architecture of a file server that may include an embodiment of the invention.

FIG. 7 is a block diagram illustrating an architecture of a file server that may include an embodiment of the invention. Certain standard and well-known components that are not germane to the present invention are not shown. The file server 700 includes one or more processors 705 and memory 710 coupled to a interconnect 720. The interconnect 720 shown in FIG. 7 is an abstraction that represents any one or more separate physical buses, point-to-point connections, or both connected by appropriate bridges, adapters, or controllers. The interconnect 720, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

The processors 705 are the central processing units (CPUs) of the file server 700 and, thus, control the overall operation of the file server 700. In certain embodiments, the processors 705 accomplish this by executing software stored in memory 710. A processor 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 710 is or includes the main memory of the file server 700. Memory 710 represents any form of random access memory (RAM), read-only memory (ROM), flash memory, or the like, or a combination of such devices. Memory 710 stores, among other things, the operating system 715 of the file server 700.

Also connected to the processors 705 through the interconnect 720 may be one or more internal mass storage devices 725, a storage adapter 730 and a network adapter 735. Internal mass storage devices 725 may be or include any conventional medium for storing large volumes of instructions and data 740 in a non-volatile manner, such as one or more magnetic or optical based disks. The storage adapter 730 allows the file server 700 to access a storage subsystem 745 and may be, for example, a Fibre Channel adapter or a SCSI adapter. The storage adapter 730 may interface with a D-blade portion of the file server. The network adapter 735 provides the file server 700 with the ability to communicate with remote devices, such as clients, over a network 750 and may be, for example, an Ethernet adapter. The network adapter 735 may interface with an N-blade portion of the file server 700.

In an embodiment of the invention, the file server 700 may utilize the storage subsystem 745 for the storage of archives of data, with snapshots being taken of the data contained in the storage subsystem 745. In an embodiment, the file server 700 may delete an older archive when a new archive is stored and utilize snapshots taken of archives to retain needed data from the deleted archives.

Figure 8:
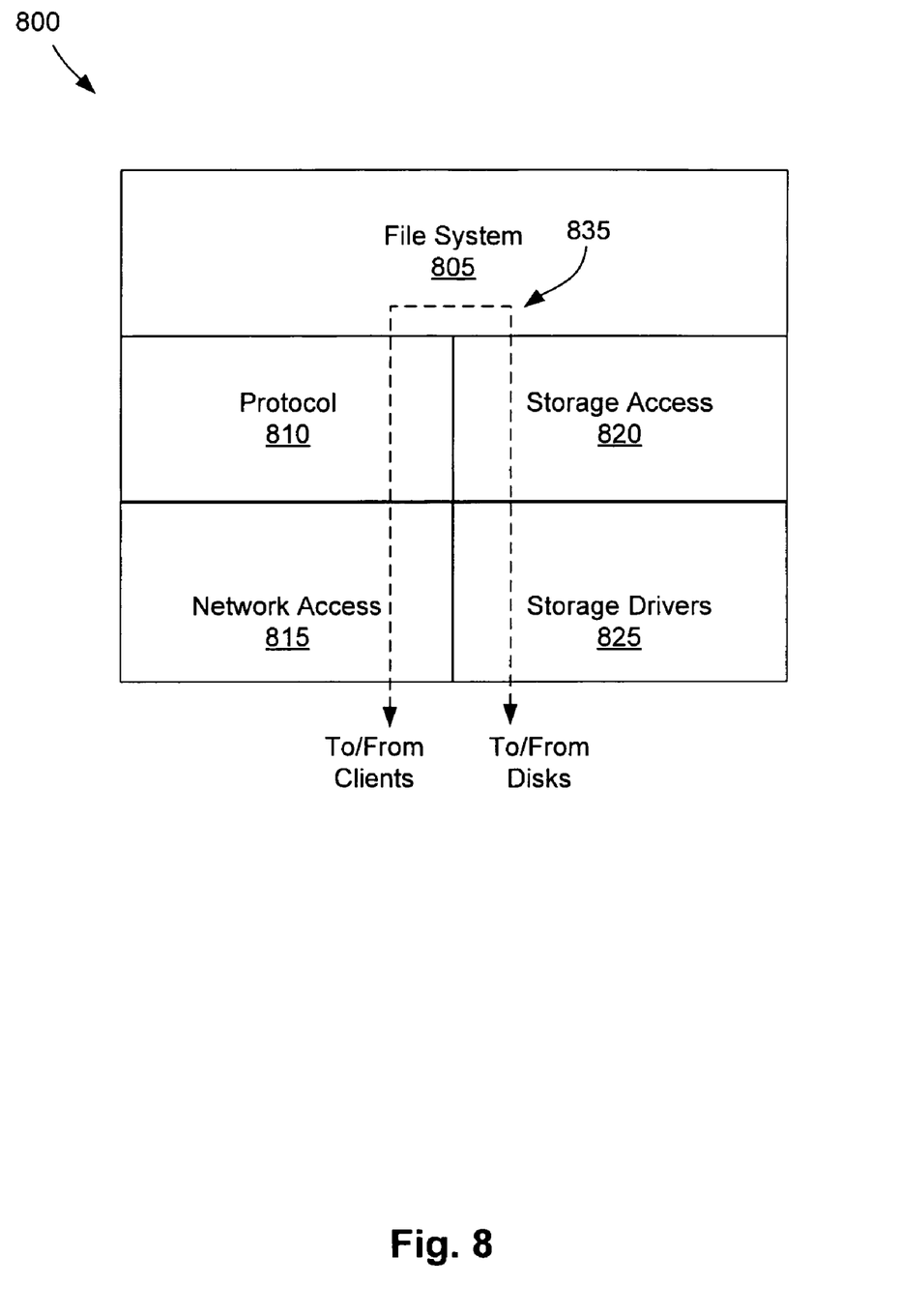
FIG. 8 illustrates an example of an operating system of a file server according to an embodiment of the invention.

FIG. 8 illustrates an example of the operating system of a file server according to an embodiment of the invention. As shown, the operating system 800 includes several modules, or "layers". These layers include a file system 805. The file system 805 is software that keeps track of the directory structure (hierarchy) of the data stored in a storage subsystem and manages read/write operations on the data (i.e., executes read/write operations on the disks in response to client requests). The operating system 800 also includes a protocol layer 810 and an associated network access layer 815, to allow a file server to communicate over a network to other systems, such as clients. The protocol 810 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 815 includes one or more drivers, which implement one or more lower-level protocols to communicate over the network, such as Ethernet. Interactions between clients and mass storage devices (for example, disks) are illustrated schematically as path 835, which illustrates the flow of data through the operating system 800.

The operating system 800 further includes a storage access layer 820 and an associated storage driver layer 825 to allow a file server to communicate with a storage subsystem. The storage access layer 820 implements a higher-level disk storage protocol, such as RAID, while the storage driver layer 825 implements a lower-level storage device access protocol, such as Fibre Channel Protocol (FCP) or SCSI. To facilitate description, it is henceforth assumed herein that the storage access layer 820 implements a RAID protocol, such as RAID-4 or RAID-DP™ (RAID double parity for data protection provided by Network Appliance, Inc.), and therefore may alternatively be referred to as RAID layer 820.

In one embodiment of the invention, the operating system enables the efficient archival of data by generating data archives, deleting data archives as new data archives are generated, and utilizing snapshots to retain data from deleted archives Thus, a method and apparatus for caching of data requests in a session-based environment have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    generating, by a storage server, a series of archives of subset of a data storage, each archive of the series of archives being stored in the data storage;
    releasing an older archive in the series of archives from the data storage at an end of a period of time after a new archive in the series of archives is generated; and
    generating a point-in-time image of the whole data storage after the older archive in the series of archives is released, wherein the point-in-time image includes a plurality of archives, and wherein data captured by the point-in-time image includes data contained in the new archive.

2. The method of claim 1, further comprising deleting any point-in-time images of the data storage that are older than a threshold age value, wherein deleting an image includes releasing any data of an archive that was captured by the image.

3. The method of claim 1, wherein archives in the series of archives are generated at periodic intervals.

4. The method of claim 1, wherein a first point-in-time image captures a first archive, and wherein the first point-in-time image shares one or more data blocks with the first archive.

5. The method of claim 4, wherein the one or more data blocks shared by the first point-in-time image and the first archive are retained by the first point-in-time image when the first archive is released from the data storage.

6. The method of claim 1, wherein a first archive and a second archive in the series of archives comprise full backups of the set of data.

7. The method of claim 6, further comprising generating an incremental archive between the first archive and the second archive.

8. The method of claim 7, further comprising generating a point-in-time image after the incremental archive is generated.

9. The method of claim 8, further comprising releasing the first archive after the incremental archive is generated.

10. The method of claim 1, further comprising generating one or more additional point-in-time images between the point-in-time images taken after each new archive in the series of archives is generated.

11. The method of claim 1, wherein the series of archives is included in a data volume.

12. A storage server comprising:
    a processor; and a storage adaptor coupled with the processor, the storage adaptor to be coupled with a storage subsystem, the storage subsystem including a data storage, wherein the data storage is to include:

one or more archives of a series of archives of a subset of the data storage, the processor to remove an older archive from the data storage at an end of a period of time after a new archive is stored in the data storage, and one or more point-in-time images of contents of the whole data storage, wherein the point-in-time images include a plurality of archives, the processor to generate a point-in-time image of the data storage after the older archive is removed.

13. The storage server of claim 12, wherein the storage server does not include any data elements that are older than a threshold age value.

14. The storage server of claim 12, wherein a point-in-time image and an archive share a data block if an identical data block is included in both the image and the archive.

15. The storage server of claim 12, wherein a first archive and a second archive share a data block if an identical data block is included in both the first archive and the second archive.

16. The storage server of claim 12, wherein the storage subsystem further includes a second data storage, the second data storage to contain the set of data.

17. The storage server of claim 12, wherein the series of archives are generated according to a schedule.

18. The storage server of claim 17, wherein generation of the series of archives is directed by a client system.

19. The storage server of claim 18, wherein the client system is coupled with the storage server via a network.

20. The storage server of claim 12, wherein a plurality of point-in-time images are generated between a time that an archive in the series of archives is removed and a time that a succeeding archive in the series of archives is stored.

21. A computer-readable storage medium having stored thereon data representing sequences of instructions that, when executed by a processor, cause the processor to perform operations comprising:

storing a first archive of a subset of a data storage in the data storage;

capturing a first image of the whole data storage, the first image comprising a plurality of archives including the first archive;

storing a second archive of the set of data in the data storage;

deleting the first archive of the data storage at an end of a period of time after the second archive is stored; and capturing a second image of the whole data storage after the first archive is deleted, the second image comprising a plurality of archives including the second archive.

22. The medium of claim 21, wherein the sequences of instructions further include instructions that, when executed by a processor, cause the processor to perform operations comprising further comprising deleting an image that is older than an age limit.

23. The medium of claim 21, wherein capturing an image of the data storage includes sharing one or more data blocks with an archive that is stored in the data storage.

24. The medium of claim 21, further comprising capturing one or more additional images between the capture of the first image and the capture of the second image.

25. The medium of claim 21, wherein the image is a point-in-time image.

* * * * *